United States Patent [19]
Burger

[11] 3,753,462
[45] Aug. 21, 1973

[54] APPARATUS FOR HEATING AND COOLING A VEHICLE PASSENGER COMPARTMENT

[75] Inventor: Karl-Heinz Burger, Buhl, Germany

[73] Assignee: Robert Bosch GmbH, Stuttgart, Germany

[22] Filed: Nov. 1, 1971

[21] Appl. No.: 194,575

[30] Foreign Application Priority Data
Oct. 30, 1970  Germany............... P 20 53 370.4

[52] U.S. Cl....................... 165/23, 165/27, 165/42, 237/12.3 B
[51] Int. Cl............................................. B60h 3/04
[58] Field of Search .................. 165/22, 23, 42, 43, 165/50, 27; 237/12.3 B; 62/243, 244, 323

[56] References Cited
UNITED STATES PATENTS

| | | | |
|---|---|---|---|
| 3,101,779 | 8/1963 | Yuen | 165/50 |
| 2,336,733 | 12/1943 | Hull | 165/43 X |
| 2,106,515 | 1/1938 | Wanamaker | 165/43 |
| 3,472,313 | 10/1969 | Milgram et al. | 165/50 X |
| 3,585,812 | 6/1971 | Parker | 62/244 X |
| 3,165,148 | 1/1965 | Soule | 165/50 X |

FOREIGN PATENTS OR APPLICATIONS

| | | | |
|---|---|---|---|
| 1,551,286 | 2/1970 | Germany | 165/23 |

Primary Examiner—Manuel A. Antonakas
Attorney—Michael S. Striker

[57] ABSTRACT

An apparatus for heating and cooling the passenger compartment of a motor vehicle quickly brings the temperature of the compartment to the desired level and the temperature is thereafter maintained at a constant level without the use of blowers. The apparatus includes first and second heat exchangers which are separately or in combination selectively connected for establishing a heat-exchanging relationship between a third heat exchanger and the first and second heat exchangers. The third heat exchanger has a relatively large surface area and is located within the vehicle passenger compartment. The first and second heat exchanger rapidly bring the temperature of the passenger compartment to the desired level with the assistance of blowers, adjacent to these two heat exchangers, which blow the conditioned air into the passenger compartment. After the desired temperature has been reached, the fans are turned off and the temperature in the compartment is maintained by radiation by the third heat-exchanger and at least one of the other two heat exchangers.

13 Claims, 4 Drawing Figures

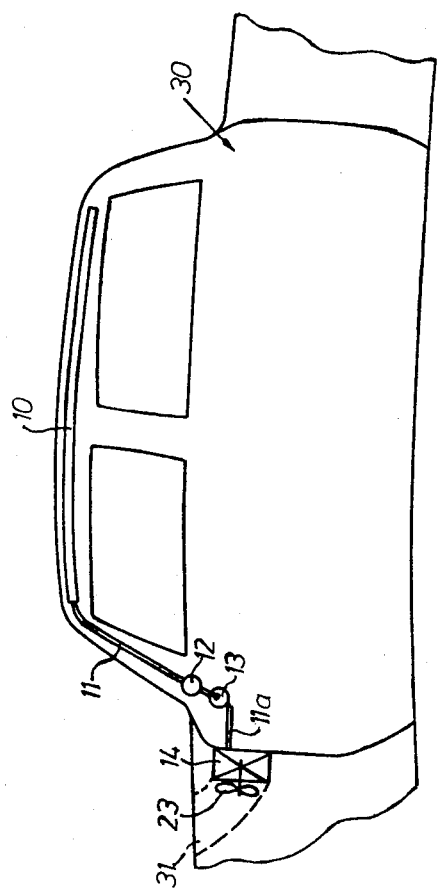

APPARATUS FOR HEATING AND COOLING A VEHICLE PASSENGER COMPARTMENT

BACKGROUND OF THE INVENTION

The present invention relates to heat exchangers, and in particular to heating and cooling system for obtaining and maintaining a desired temperature within the passenger compartment of a motor vehicle.

Most vehicles today have some form of temperature control whereby it is possible to maintain the temperature in the passenger compartment within a comfortable range. Temperature control systems have typically included heaters which have warmed the passenger compartment and air conditioners which have cooled such compartment. In fact, the trend today is to provide total comfort control by combining the heating the cooling functions whereby the passenger selects a desired temperature and the passenger compartment is either cooled or heated as required to attain and maintain said temperature.

However, with the temperature control systems known to date, there have been numerous problems. Thus, some temperature control systems utilize fans for blowing the conditioned air into the passenger compartment. The systems which have made use of high capacity blowers have generally been successful in rapidly attaining the desired temperature. However, the use of high capacity blowers results in substantial drafts within the passenger compartment. These drafts are often directed directly at least at some of the passengers within the compartment and this causes great discomfort to them and may also injure their health. On the other hand, those systems which have utilized low capacity blowers have generally required great intervals of time to attain the desired temperature within the compartment. With the lower capacity fans, the drafts within the compartment, and thus the discomfort to the passengers, has been considerably decreased. The disadvantage with the use of high or low capacity blowers, has also been that even after the desired temperature has been attained, it has been necessary to continue to operate the blowers to maintain the temperature at the desired level. The continued operation of a blower for this purpose, with the attendant drafts in the passenger compartments, has resulted in the introduction of multi-speed blowers. These blowers are capable of operating at several speeds, the speed being selectable by the passenger within the compartment. With the variable-speed blowers, the high speed step has generally been utilized to rapidly attain the temperature when the controlled system is initiated, and the lower step is the one generally utilized in order to continuously recondition the air within the passenger compartment in order to maintain a nearly constant temperature. However, even with this type of multi-speed fan, the lowest speed which has been practical, has still been relatively high since a considerable amount of air must be blown into the passenger compartment in order to maintain the temperature with conventional temperature control systems. This has partly been the case because motor vehicle passenger compartments are generally not insulated from the outside and as such there is considerable heat transfer constantly taking place between the interior of the passenger compartment and the vehicle exterior.

It has also been known to utilize large-surface heat exchangers which do not make use of fans but only make use of radiation. These heat exchangers have been successfull in increasing the comfort of the passengers but require an extremely long period before the passenger compartment initially attains the desired temperature.

SUMMARY OF THE INVENTION

An object of the present invention is to provide an apparatus for heating and cooling a space, particularly the interior of a motor vehicle, which does not have the disadvantages of the prior art.

Another object of the present invention is to provide an apparatus for heating and cooling the interior of a motor vehicle which attains the desired temperature in the passenger compartment in a short period of time and which maintains the desired temperature without the use of blower fans.

A further object of the present invention is to provide an apparatus for heating and cooling the interior of a motor vehicle which is easy to operate and effective to maintain a desired temperature within the passenger compartment.

A still further object of the present invention is to provide an apparatus for heating and cooling a passenger compartment of a motor vehicle which requires less space in the passenger compartment and which makes possible the use of lower capacity blowers.

According to the present invention an apparatus for heating and cooling a space, particularly the interior of a motor vehicle, comprises several heat exchangers. A first heat exchanger means is provided for conditioning the air entering the space by heating it. A second heat exchanger means is provided for conditioning the air entering the space by cooling it. At least one third heat exchanger means is provided which is adapted to both cool and heat the space. Circuit means are provided which connect said third heat exchange means with said first and second heat exchanger means. Control means are provided for selectively establishing a heat exchanging relationship via said circuit means between said third heat-exchanger means and at least one of said first and second heat exchanger means.

According to a presently preferred embodiment, the first heat exchanger means represents a heater and a second heat exchanger means represents an air conditioner and the third heat exchanger means has a relatively large surface area and is located within the space and is adapted to both heat or cool the space. Blowers are provided in the region of the first and second heat exchanger means for blowing conditioned air into the passenger compartment. When the temperature control system is first turned on, at least one of the blowers is likewise turned on in order to increase the speed with which heat is transferred to the passenger compartment. After the desired temperature in the passenger compartment has been attained, the blowers are switched off while a heat-transfer medium is permitted to flow through the third heat exchanger means and at least one of said first and second heat exchanger means. In this manner, heat exchange is maintained with the passenger compartment by radiation with the appropriate heat exchangers.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is a side elevational view of a fragmented vehicle, showing the passenger compartment and the arrangement of some of the components of the apparatus according to the present invention as shown in FIG. 1.

DETAILED DESCRIPTION OF THE PREFERRED EMBODIMENTS

Figure 1:
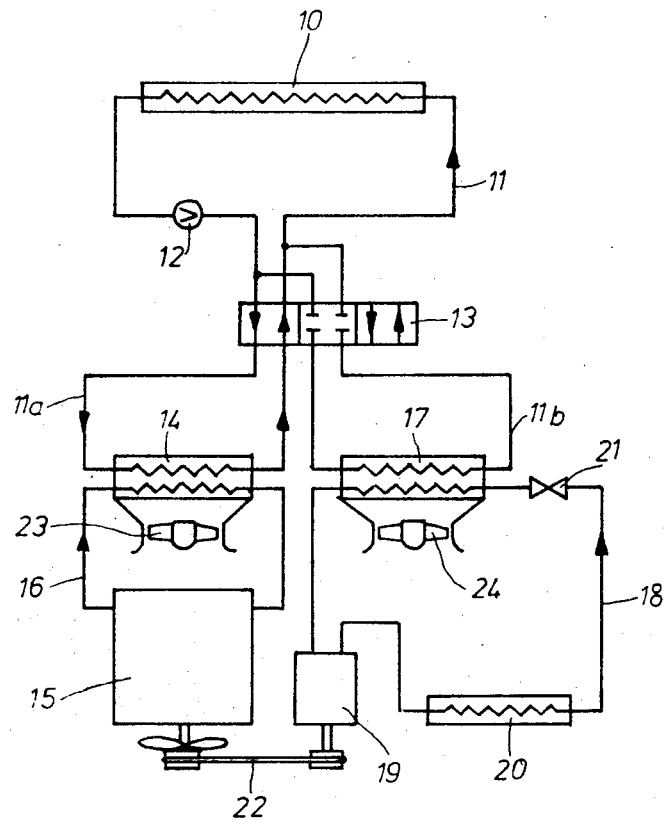
FIG. 1 is a schematic diagram of an apparatus for heating and cooling the interior of a motor vehicle in accordance with the present invention, shown in a condition where the compartment is being heated.

Referring to the drawings, in which like reference numerals are used to designate like parts throughout, and looking first at FIG. 1, the present invention consists of a heat exchanger 10 which forms part of a circuit 11. A pump 12 is provided in series with the heat exchanger 10 in the circuit 11. Two other circuits, circuits 11a and 11b, are connected to circuit 11 by means of a control valve 13. The function of control valve 13 is to connect the two conductors of the circuit 11 with the two conductors of at least one of the circuits 11a and 11b. The control valve 13 is operable by a passenger within the passenger compartment of a motor vehicle, and is easily moved so as to make the selection of which circuits are to be completed relatively simple. It will be noted with this arrangement, that circuit 11a or 11b will either be connected with circuit 11 at any particular time or be open. Circuit 11a connects with heat exchanger 14, heat exchanger 14 also having another circuit 16 which is connected to internal combustion engine 15 of the motor vehicle. The circuit 16 is typically connected to the cooling system of the internal combustion engine 15. Thereby, the heated fluid flowing in the engine cooling system flows through circuit 16 through heat exchanger 14, thereby making available heat which can be transferred into the passenger compartment.

On the other hand, circuit 11b is connected to a heat exchanger 17. Heat exchanger 17 is provided with a circuit 18 which forms part of an air conditioning system which includes compressor 19, condensor 20 and expansion valve 21. Compressor 29 is driven by the internal combustion engine 15 by means of belt 22. However, any other means may be equally used, such as an electric motor.

The heat exchanger 10 is located within the passenger compartment of the vehicle and is designed to have a relatively large surface area to make possible considerable radiation and heat transfer with the passenger compartment. Adjoining heat exchangers 14 and 17 are blowers 23 and 24, respectively. The positioning of both heat exchangers 14 and 17, as well as blowers 23 and 24, will be made clear hereinafter with respect to the description of FIG. 4. The heat exchangers 14 and 17 are provided with blowers, heat exchanger 10 only relying on its radiating capability resulting from its large surface area.

The temperature-controlling system shown in FIG. 1 shows control valve 13 in a position which establishes a heat-exchanging relationship via circuits 11 and 11a between the heat exchanger 10 and the heat exchanger 14. For this purpose, circuit 11 can be regarded as an input circuit to the heat exchanger 10 and circuits 11a and 11b can be regarded as output circuits of heat exchangers 14 and 17, respectively. As illustrated in FIG. 1, the heat transfer medium in the circuit 16 is heated by the internal combustion engine 15. The medium in circuit 16 passes through the heat exchanger 14, transferring some of its heat to a heat transfer medium in circuit 11a. Since control valve 13 is positioned so as to form a closed circuit between circuits 11 and 11a, the heat transfer medium within circuit 11a is forced to circulate through the circuit 11 by reason of the pumping action of the pump 12. The heat transfer medium within the circuit 11a carries some of the heat which it has acquired in the heat exchanger 14 to the heat exchanger 10. As stated above, the heat exchanger 10 has a relatively large surface area, and most of the heat which is carried by the heat transfer medium entering the heat exchanger 10 is released within the passenger compartment by radiation.

When the temperature control system is first initiated, blower fan 23 can be activated. This would have the effect of forcing conditioned air which has been heated as it passed the heat exchanger 14 into the passenger compartment. In addition to the forced-air heat transfer, radiation from the surfaces of the heat exchangers 10 and 14 also contribute to attain the desired temperature. Initially, however, the contributions by the forced-air heat transfer is substantially greater that that contributed by radiation. As such, the blower 23 is turned on and maintained until the desired temperature is attained. Afterwards, the blower 23 may be disconnected. At this time the action described above of both heat exchangers 10 and 14 would nevertheless continue and heat would continue to be delivered to the passenger compartment, now, however, only by radiation. By appropriately selecting the dimensions of the heat exchangers, and particularly the heat exchanger 10, it is possible to maintain the desired temperature within the passenger compartment merely by use of heat transfer by radiation.

Figure 2:
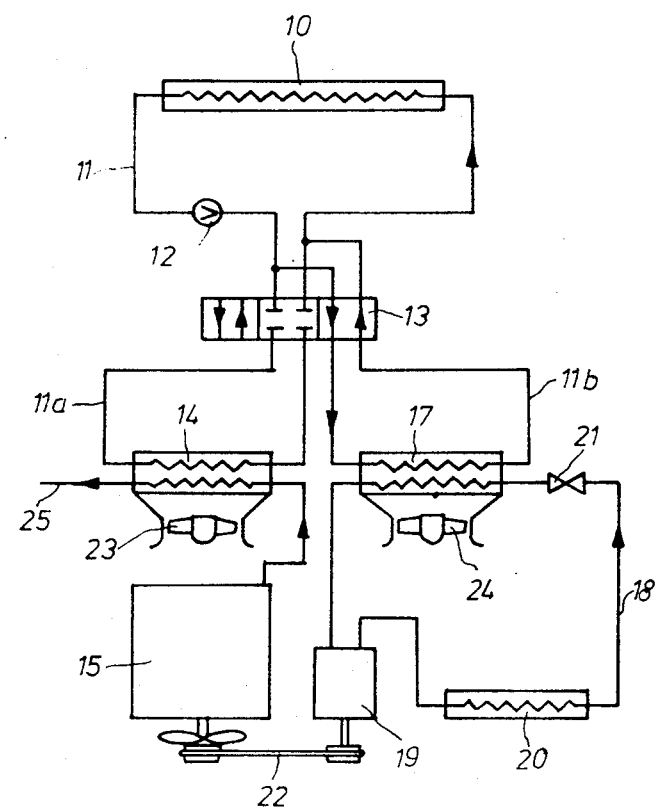
FIG. 2 is a modified arrangement of the present invention as shown in FIG. 1, wherein the passenger compartment is being cooled.

In FIG. 2, a modification is shown whereby the heat delivered to the heat exchanger 14 is not by means of the cooling system of the internal combustion engine 15, but by utilizing the hot exhaust gases emanating from the internal combustion engine 15. Thus, circuit 25 now represents the path taken by the exhaust gases as they travel from the internal combustion engine 15, through the heat exchanger 14 and out to the exterior of the motor vehicle, possibly through the exhaust pipes and/or muffler.

In FIG. 2, the control valve 13 is shown to form a complete circuit between the circuit 11 and the circuit 11b. This selection provides cooling of the passenger compartment, as explained above. The heat exchanger 17 may form part of a conventional air-conditioning system which is commonly found in motor vehicles. In other respects, the operation of the temperature control system to lower the temperature in the passenger compartment is identical with that described above in connection with heating that compartment. Thus, pump 12 forces a heat transfer medium to flow within circuits 11 and 11b through control valve 13. When the heat transfer medium passes through the heat exchanger 17, heat is removed from said medium, or stated another way, the medium is cooled. The cooled medium flows through the circuits as shown and progresses through heat exchanger 10, which as stated above has a larger surface area. Heat transfer takes place at the heat exchanger 10, in that the heat which is present in the passenger compartment is at least in part absorbed by the cooler medium. In this manner, the passenger compartment is cooled.

Figure 3:
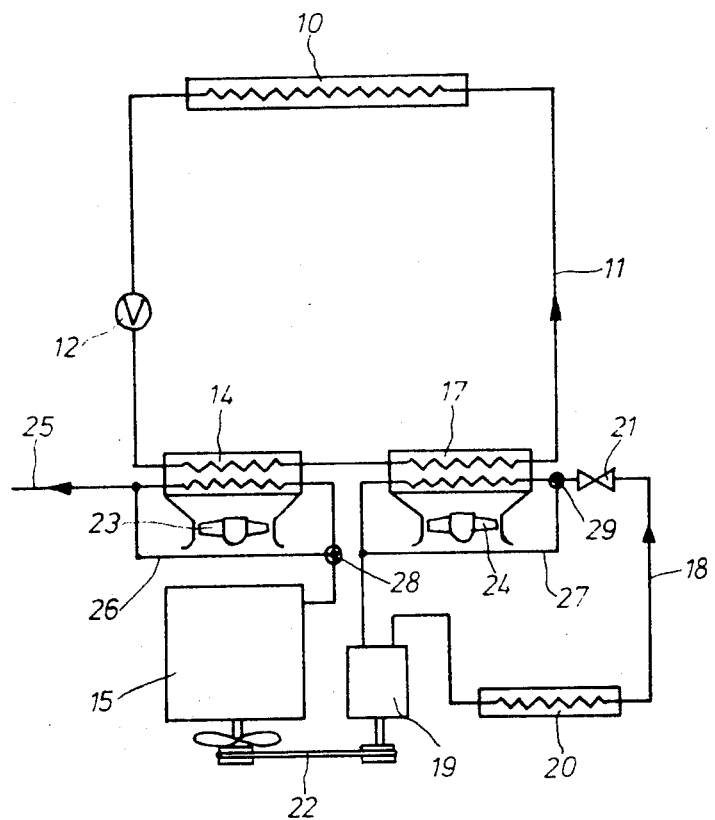
FIG. 3 is a still further modified embodiment of the present invention wherein the heat exchangers are connnected in series.

A still further embodiment is illustrated in FIG. 3. Here, heat exchangers 10, 14 and 17 are shown to be connected in series. The pump 12 causes heat transfer medium within the now single circuit 11 to flow through all these heat exchangers. The temperature of the heat transfer fluid in circuit 11 is a function of the temperatures of the two heat exchangers 14 and 17 through which the medium passes. Accordingly, by-pass circuits 26 and 27 are provided, each by-pass circuit by-passing a corresponding heat exchanger as shown in FIG. 3. Valve 28 controls the temperature of heat exchanger 14, while valve 29 controls the temperature of heat exchanger 17. For example, where the temperature in the passenger compartment is to be elevated and it is necessary that the heat exchange medium within circuit 11 be heated and raised to a higher temperature. In order to accomplish this, it is necessary to heat the medium passing through heat exchanger 14 as described in connection with FIG. 2.

Thus, valve 28 is adjusted to close bypass circuit 26. The hot exhaust gases emanating from the internal combustion engine 15 are thereby prevented from by-passing the heat exchanger 14 and are forced to pass through said heat exchanger. As described above, the passage of such hot exhaust gases through the heat exchanger 14 is sufficient to heat the heat exchanger medium which passes, now in circuit 11. On the other hand, cooling of the heat exchange medium flowing in circuit 11 would tend to lower the temperature of the medium, if heat exchanger 17 operated as described in connection with FIG. 2. Since this is counter-productive, valve 29 is adjusted to open bypass circuit 27, enabling the cooling medium flowing in circuit 18 of the air-conditioning system to bypass the heat exchanger 17. In this manner, the heat exchanger 17 is not effective to extract the heat which has been furnished to the medium flowing in circuit 11, this heat being reserved almost exclusively for heat exchange within the passenger compartment. If it is desired to cool the passenger compartment, the opposite steps would be taken, i.e., bypass circuit 26 would be opened while bypass circuit 27 would be closed. Under these conditions, the hot exhaust gases would not be effective to heat the medium flowing in circuit 11, while the cooling medium flowing through circuit 18 and heat exchanger 17 would be effective to lower the temperature of the medium flowing in circuit 11, and therefore also of the passenger compartment.

FIG. 4 is a sketch of a passenger compartment of a motor vehicle illustrating one possible arrangement of several of the components already discussed with reference to the first three Figures. Thus, passenger compartment 30 is shown to be connected with an inlet duct 31. Inlet duct 31 is typical of the type commonly forming part of the vehicle ventilation system. Heat exchanger 10 is located within the passenger compartment 30, in this case connected to the roof of the compartment. However, it is equally possible to place the heat exchanger 10 on the floor of the compartment or on the side walls. Heat exchanger 14 and blower 23 are shown to be situated within the inlet duct 31 so that a stream of air entering into said duct supplements the conditioned air otherwise entering into the passenger compartment 30. Although only the heat exchanger 14 is illustrated, the heat exchanger 17 discussed in relation to FIGS. 1-3, can be similarly situated. The circuit 11 and the circuit 11a are shown to connect the heat exchangers 10 and 14 through the control valve 13 and the pump 12. The control valve 13 is positioned in relation to the passenger compartment 30 in such a way that it is easily accessible by the passenger, such as in the region of the automobile dashboard. Although this is only one example of the possible arrangements of the heat exchangers, this arrangement is especially useful. For one, the heat exchanger 10 can extend over the entire area of the roof of the passenger compartment and, as such, the heat exchanger 10 can offer a larger radiating surface. By placing the heat exchangers 14 and 17 as shown in FIG. 4, these heat exchangers, even with the blowers 23 and 24 switched off, can maintain the desired temperature in two ways. The first way that the heat exchangers 14 and 17 help to maintain the compartment temperature is by radiating heat or absorbing heat by direct radiation, much in the same way as done by the heat exchanger 10. Also, by permitting some air to continuously flow through the inlet duct 31 past the heat exchangers 14 and 17, this incoming air is conditioned and directed into the passenger compartment. However, the present invention does not depend to a great extent on the contribution by this conditioned incoming air for maintaining the temperature. By appropriately selecting the surfaces areas and positions of the heat exchangers 10, 14 and 17, the maintainance of the desired temperature within the passenger compartment 30 could be accomplished only by means of direct radiation. Because the the present invention does not heavily rely on the conditioned incoming air in order to maintain the desired temperature, this element can be kept to a minimum if desired. By eliminating the need to force streams of conditioned air into the passenger compartment in order to maintain the desired temperature, the comfort of the passengers is greatly enhanced.

While the invention has been illustrated and described as embodied in an apparatus for heating and cooling the interior of a motor vehicle, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptions should and are intented to be comprehended within the meaning and range of equivalence of the following claims.

What is claimed as new and desired to be protected by Letters Patent is set forth in the appended claims.

I claim:

1. Apparatus for heating and cooling a space, particularly the passenger compartment of a motor vehicle, comprising in combination first heat exchanger means for conditioning air by heating the same; second heat exchanger means for conditioning air by cooling the same; blower means associated with and positioned in proximity to said first and second heat exchanger means and operative for blowing conditioned air into said space so that the temperature of air in said space can be rapidly brought to a desired temperature; third heat exchanger means arranged for exchanging heat with the air in said space; circuit means connecting said third heat exchanger means with said first and second heat exchanger means; and control means for selectively establishing a heat-exchanging relationship via said circuit means between said third heat exchanger means and at least one of said first and second heat exchanger means to cause said third heat-exchanger means to keep the air in said space at a desired temperature when said blower means is not in operation.

2. Apparatus as defined in claim 1, wherein said first and second heat exchanger means have output circuits connected to said control means which are adapted to conduct heat exchange mediums, and said third heat exchanger means has an input circuit connected to said control means which is adapted to carry said mediums, said input and output circuits forming part of said circuit means, said medium flowing in said input circuit having a temperature which corresponds to that of one of said first and second heat exchanger means with which said third heat exchanger means established a heat-exchanging relationship.

3. Apparatus as defined in claim 2, further comprising at least one pump means in one of said circuit means for circulating said mediums.

4. Apparatus as defined in claim 2, wherein said control means includes valve means for selectively connecting said input circuit to one of said output circuits.

5. Apparatus as defined in claim 4, further comprising at least one pump means arranged between said third heat exchanger means and said valve means for circulating said mediums.

6. Apparatus as defined in claim 1, wherein said third heat exchanger has a relatively large surface area and is located within the space.

7. Apparatus as defined in claim 6, wherein said space is the passenger compartment of a motor vehicle, and said heat exchanger means is located on the roof of the compartment.

8. Apparatus as defined in claim 1, wherein said space is the passenger compartment of a motor vehicle having an internal combustion engine, and said first heat exchanger means is connected to the cooling system, whereby said first heat exchanger means is heated by the cooling system of the internal combustion engine.

9. Apparatus as defined in claim 1, wherein said space is the passenger compartment of a motor vehicle having an internal combustion engine, and said first heat exchanger means is connected to the exhaust system, whereby said first heat exchanger means is heated by the escaping hot exhaust gases from the internal combustion engine.

10. Apparatus as defined in claim 1, wherein said apparatus further comprises an air conditioner having a cooling circuit, said second heat exchanger unit being connected in series with said cooling circuit.

11. Apparatus as defined in claim 1, wherein said first and second heat exchange means are located in the region of said space, whereby heat transfer may take place between said first and second heat exchanger means and said space.

12. Apparatus as defined in claim 1, wherein said first, second and third heat exchanger means are connected in series, wherein said circuit means includes a bypass circuit means across each of said first and second heat exchanger means for bypassing the heat exchanging mediums which bring heat to and carry heat away from said first and second heat exchanger means respectively; and wherein said control means comprises valve means for opening and closing said bypass circuits, whereby the heat exchange between said third heat exchanger means and said first and second heat exchanger means is determined by the adjustment of the valve means in the bypass circuit means.

13. Apparatus as defined in claim 1, wherein said blower means comprises a first blower associated with and positioned in proximity to said first heat exchanger means for blowing heated air into said space, and a second blower associated with and positioned in proximity to said second heat exchanger means for blowing cooled air into said space.

* * * * *